(12) United States Patent
Nguyen

(10) Patent No.: US 7,920,394 B2
(45) Date of Patent: Apr. 5, 2011

(54) METHOD TO CREATE PWM SWITCHING WITH NEAR ZERO COMMON MODE NOISE

(75) Inventor: Vietson M. Nguyen, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 377 days.

(21) Appl. No.: 12/119,531

(22) Filed: May 13, 2008

(65) Prior Publication Data

US 2009/0284997 A1 Nov. 19, 2009

(51) Int. Cl.
*H02M 1/12* (2006.01)
*H02M 5/42* (2006.01)

(52) U.S. Cl. .......................... 363/41; 363/98

(58) Field of Classification Search .............. 363/98, 363/132, 41; 318/801
See application file for complete search history.

(56) References Cited

U.S. PATENT DOCUMENTS

| | | | |
|---|---|---|---|
| 5,065,303 A | 11/1991 | Nguyen | |
| 5,120,986 A | 6/1992 | Shekhawat | |
| 5,327,335 A | 7/1994 | Maddali | |
| 5,621,628 A | 4/1997 | Miyazaki | |
| 6,084,786 A | 7/2000 | Rozman | |
| 6,134,127 A | 10/2000 | Kirchberg | |
| 6,288,921 B1 | 9/2001 | Uchino | |
| 6,459,596 B1 | 10/2002 | Corzine | |
| 6,510,062 B2 | 1/2003 | Goder | |
| 6,535,406 B1 * | 3/2003 | Asaeda et al. | 363/98 |
| 6,838,925 B1 * | 1/2005 | Nielsen | 363/98 |
| 7,050,311 B2 | 5/2006 | Lai | |
| 7,126,409 B2 * | 10/2006 | Nielsen | 363/98 |
| 2003/0048650 A1 | 3/2003 | Asaeda et al. | |
| 2006/0197491 A1 * | 9/2006 | Nojima | 318/801 |

FOREIGN PATENT DOCUMENTS

WO 2004/015851 2/2004

OTHER PUBLICATIONS

Welchko et al., A Three-Level MOSFET Inverter for Low-Power Drives, Jun. 2004,IEEE Trans. Industrial Electronics, vol. 51, pp. 669-674.*
European Search Report for EP Application No. 09251305.0, Aug. 10, 2009.

* cited by examiner

*Primary Examiner* — Adolf Berhane
*Assistant Examiner* — Jue Zhang
(74) *Attorney, Agent, or Firm* — Carlson, Gaskey & Olds, P.C.

(57) ABSTRACT

A method for controlling a three-level inverter with a two-level inverter controller uses a conversion circuit to process the two-level control signals and output a set of three-level control signals.

21 Claims, 4 Drawing Sheets

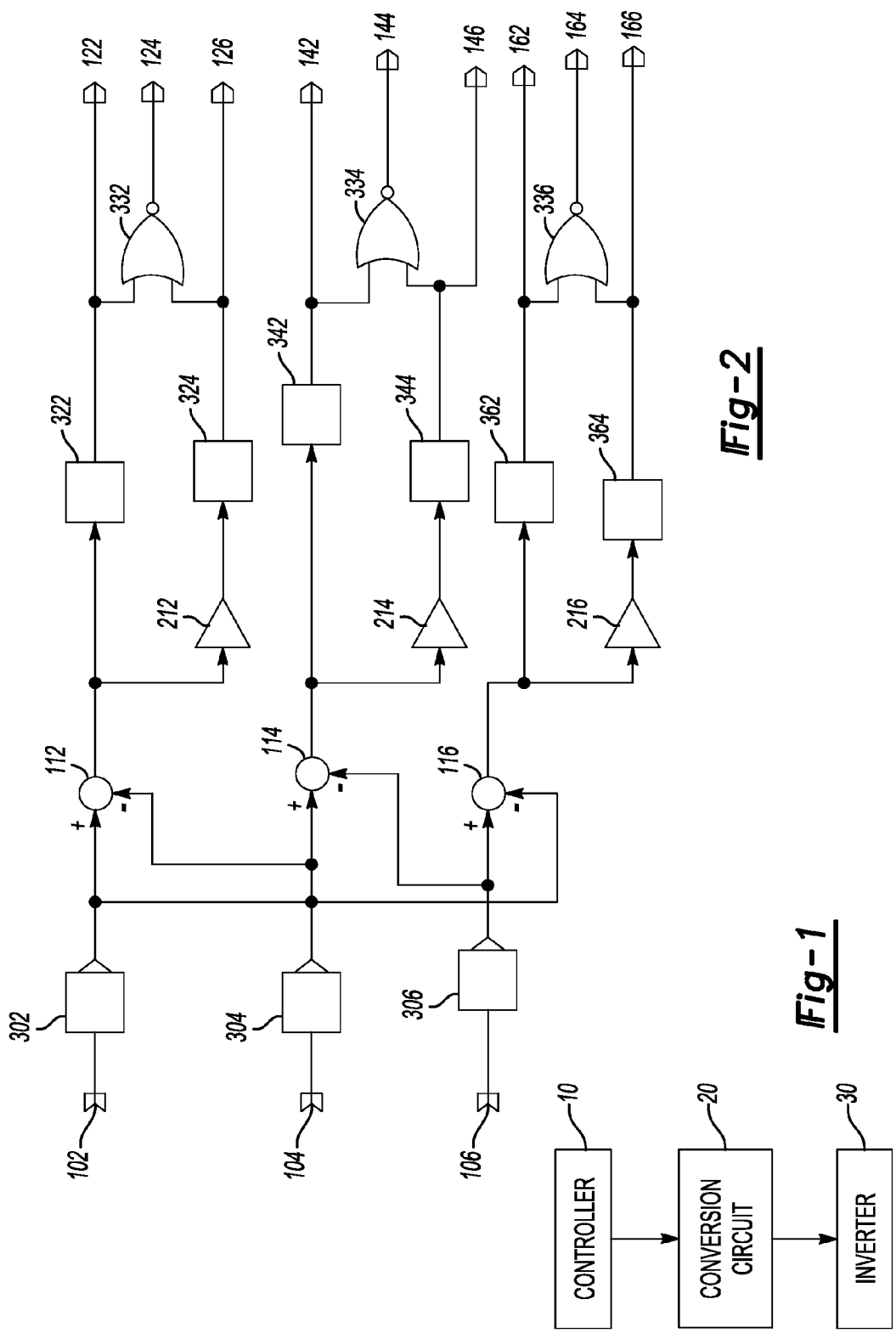

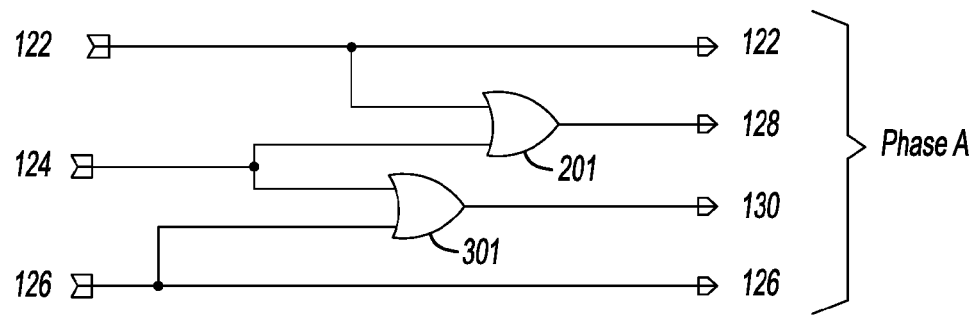
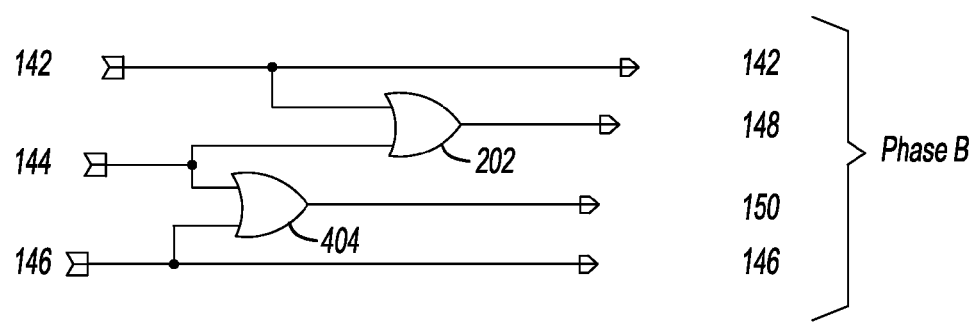
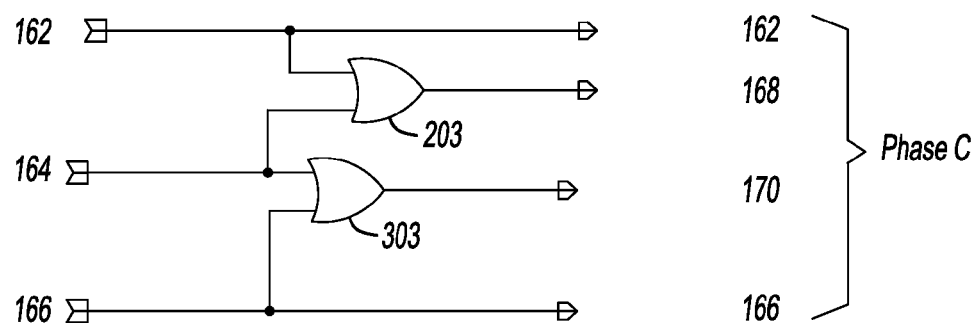
Fig-6

METHOD TO CREATE PWM SWITCHING WITH NEAR ZERO COMMON MODE NOISE

BACKGROUND OF THE INVENTION

This application concerns a method of controlling a three-level power inverter using a two-level power inverter controller, and an apparatus for implementing the same.

It is known that when creating a power inverter/inverter controller scheme a three-level inverter has many advantages over a two-level inverter. Among these advantages are an increased power rating, improved harmonic performance, and a reduction in the electromagnetic interference. A "two-level" inverter (converter) utilizes a control signal comprising two digital signals; one drives the top power switch while the other drives the bottom switch. The combination of these digital signals into a single control signal results in a signal having two steps, i.e. one (logic 1) representing the time to turn-on a positive voltage and zero (logic 0) representing the time to turn-on a negative voltage. During the transition time the control wave is positioned as a transition edge between up and down. In real applications, there is always a need of a short time interval called "dead-time" where neither top or bottom power switch will be turned-on. This short time interval is inherently needed to be inserted as a mean to prevent the shoot-through condition and would not be discussed in details herein. A "three-level" inverter, on the other hand, utilizes a control signal comprising three digital signals. This results in an output voltage comprised of three voltage levels for each single phase: a positive voltage, a zero voltage and a negative voltage. Since a three-level inverter requires the input of a control wave having three steps, and a two-level inverter controller can only output a control wave having two steps, some processing should be done on the control signal from the two-level inverter controller to make it compatible with a three-level inverter.

It is also known that many current applications and devices utilize a two-level inverter controller. Should a user wish to connect a three-level inverter to any of these devices, a converter should be used for the reasons described above. While two-level inverters are known in the art, all currently known two-level inverters introduce unacceptably high levels of harmonics and electrical noise into the system resulting in poor power quality, as well as other potential drawbacks.

SUMMARY OF THE INVENTION

A method and apparatus for deriving the control signals to a three-level inverter from an existing two-level inverter controller by which the apparatus first receives three pulse width modulation signals from the two-level inverter controller. The three pulse width modulation signals are processed using a logic circuit and the result is output as three-level inverter control signals.

These and other features of the present invention can be best understood from the following specification and drawings, of which the following is a brief description.

BRIEF DESCRIPTION OF THE DRAWINGS

FIG. 1 illustrates a simplified block diagram of a two-level power inverter controller, a conversion circuit, and a three-level power inverter that could perform the described method.

FIG. 2 illustrates a hybrid digital/analog conversion circuit that could perform the described method.

FIG. 6 illustrates further logic gates for use with the example diode-clamped three-level inverter of FIG. 5.

DETAILED DESCRIPTION OF AN EMBODIMENT

Figure 3:
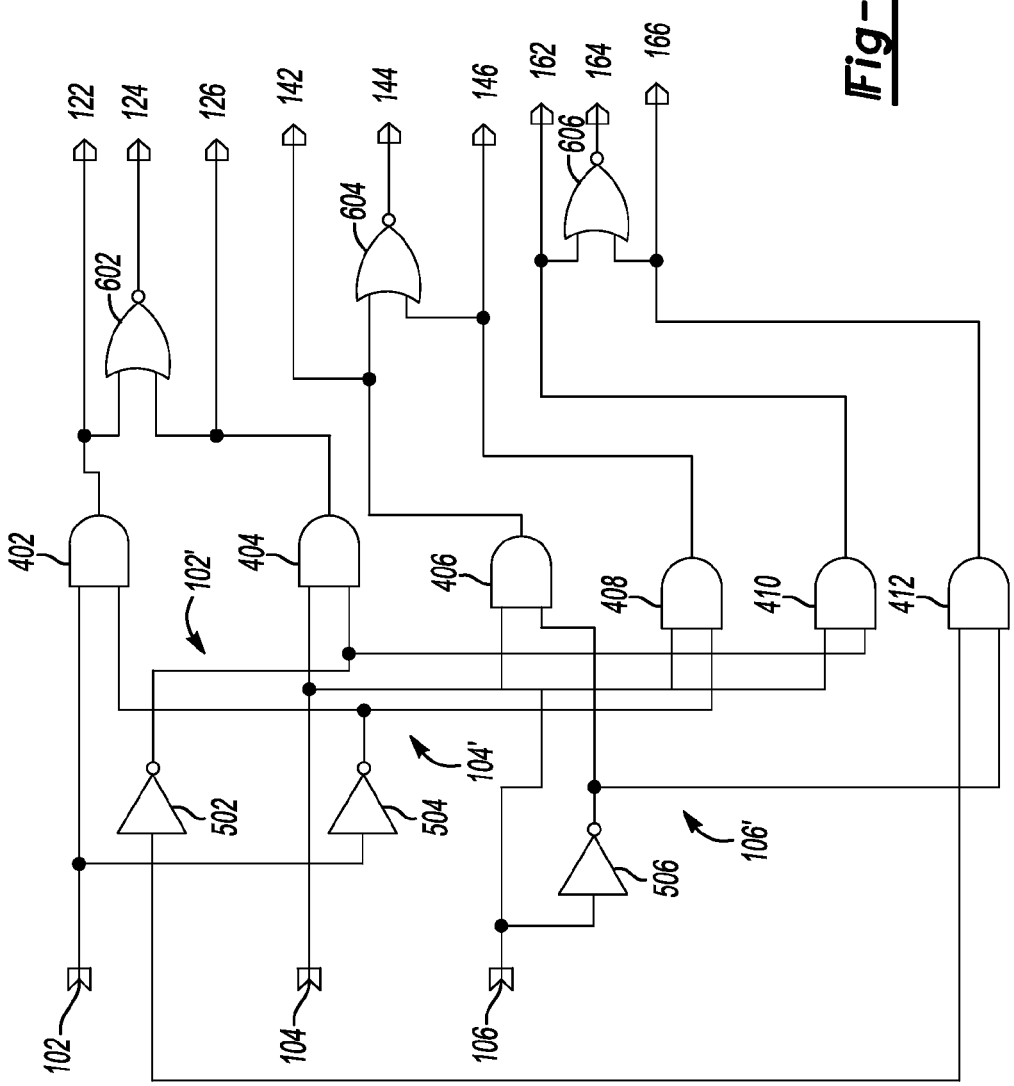
FIG. 3 illustrates a digital circuit that could perform the described method instead of the one presented in FIG. 2.

FIG. 1 shows a simplified block diagram of an embodiment of the method of this application. In FIG. 1 the controller 10 outputs two-level control signals which are then inputs to the conversion circuit 20. The conversion circuit 20 modifies the two-level control signals into three-level control signals and then outputs the resulting three-level control signals. The three-level inverter 30 then receives the three-level control signals and performs the corresponding actions.

FIG. 2 illustrates an embodiment of the conversion circuit where a combination of analog processing and digital processing is used to convert the two-level control signals 102, 104, 106 into three-level control signals 122, 124, 126, 142, 144, 146, 162, 164, 166. The embodiment of FIG. 2 can work with any standard two-level inverter controller. A typical two-level inverter will output six control signals. Each of these signals corresponds to one other signal resulting in three signal pairs. The signals in each pair are inversions of each other, and as such it is only necessary to utilize one signal from each pair for the conversion process. In the embodiment of FIG. 2 the conversion circuit receives a signal 102 from the first pair, a signal 104 from the second pair, and a signal 106 from the third pair. These two-level control signals are then converted from a digital to an analog signal in making use of digital to analog converters 302, 304, 306.

After the two-level control signals 102, 104, 106 are converted into analog signals the conversion circuit sends each signal 102, 104, 106 to an analog summer 112, 114, 116. In the first analog summer 112 the second two-level signal 104 is subtracted from the first two-level signal 102. The summer then outputs a first output signal 122. The second analog summer 114 subtracts the third two-level signal 106 from the second two-level signal 104 and outputs a second output signal 142. The third analog summer 116 subtracts the first two-level signal 102 from the third two-level signal 106 and outputs a third output signal 162.

After the analog summers 112, 114, 116 the corresponding output signals 122, 142, 162 are each sent through an inverter 212, 214, 216. The inverter 212, 214, 216 creates a new inverted output signal that is the opposite of the original output signal 122, 142, 162. The inverted output signals 126, 146, 166 and the original output signals 122, 142, 162 are then sent to analog to digital converters 322, 324, 342, 344, 362, 364. The first analog to digital converter 322 converts the first output signal 122 into a digital format, and the second analog to digital converter 324 converts the first inverted output signal 126 into a digital format. A similar operation is performed by analog to digital converters 342, 344, 362, 364 on each of the remaining analog output signals 142, 146, 162, 166 (respectively) resulting in the second output signal 142, the second inverted output signal 146, the third output signal 162, and the third inverted output signal 166 being in a digital format. After the signals 122, 126, 142, 146, 162, 166 have been converted to a digital format a digital NOR (Not-OR) gate is used to obtain a third control signal for three-level inverter topology. The NOR gates 332, 334, 336 accept each signal pair (the signals 122 and 126, 142 and 146, 162 and 166). The NOR gates 332, 334, 336 then output a signal corresponding to the NOR operation. A NOR operation outputs a positive signal when none of the inputs are positive and a zero level signal in all other states. These combined output signals 124, 144, 164 are the additional control signals sent to the three-level power inverter.

FIG. 3 illustrates an embodiment where the conversion circuit is composed of digital components only, without the need for A/D and D/A converters. The embodiment of FIG. 3 works with any standard two-level inverter controller and any standard three-level inverter. In the embodiment of FIG. 3, the two-level control signals 102, 104, 106 from each signal pair are selected in a similar manner as that described for the embodiment of FIG. 2. Once the three signals have been selected the conversion circuit uses inverter gates 502, 504, 506 to invert the signals 102, 104, 106 and the output inverted signals are 102', 104', 106'. The conversion circuit then uses a series of AND gates to create three-level output signals 122, 126, 142, 146, 162, 166. The first AND gate 402 receives the first input signal 102, and the second inverted input signal 102', and outputs the first output signal 122. The second AND gate 404 receives the second input signal 104 and the first inverted input signal 102', and outputs the first inverted output signal 126. The third AND gate 406 receives the second input signal 104 and the third inverted input signal 106' as inputs, and outputs the second output signal 142. The fourth AND gate 408 receives the third input signal 106, and the second inverted input signal 104', and outputs the second inverted output signal 146. The fifth AND gate 410 receives the third input signal 106 and the first inverted output signal 102', and outputs the third output signal 162. The sixth AND gate 412 receives the first input signal 102 and the third inverted output signal 106', and outputs the third inverted output signal 166.

After the AND gates 402, 404, 406, 408, 410, 412 perform the above described operations the output signals 122, 126, 142, 146, 162, 166 are additionally sent to NOR gates 602, 604, 606. The NOR gates 602, 604, 606 operate in an identical manner as the NOR gates 332, 334, 336 of the embodiment of FIG. 2. These operations result in the combined output signals 124, 144, and 164. The conversion circuit of FIG. 3 results in the output of nine output signals 122, 124, 126, 142, 144, 146, 162, 164, 166.

Figure 4:
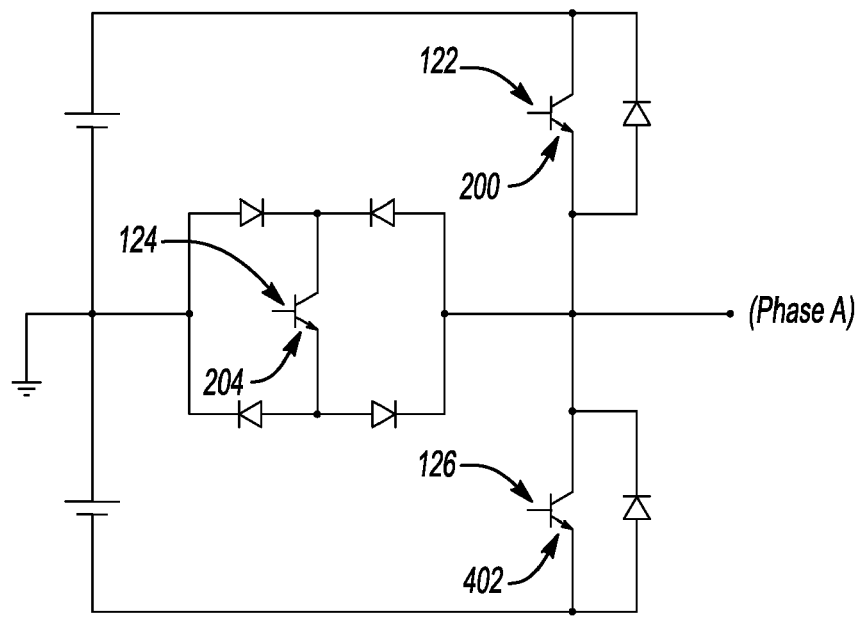
FIG. 4 illustrates an example three-level inverter.
Figure 5:
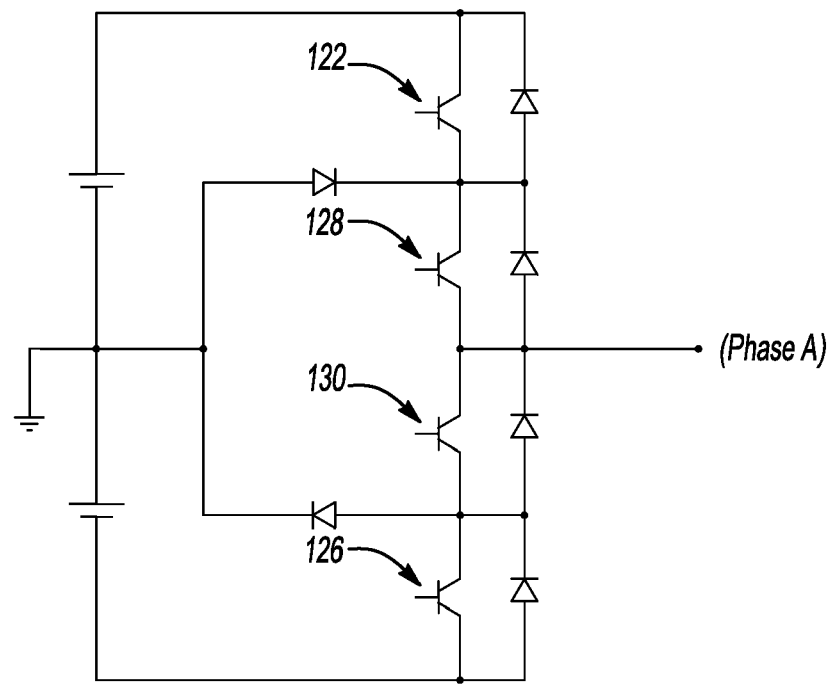
FIG. 5 illustrates an example diode-clamped three-level inverter.

In both described embodiments the output signals of the conversion circuit are in a format that can be used to control any standard three-level inverter. In practice, there are at least two different types of three-level inverters as shown in FIG. 4 and FIG. 5. In these two figures, the symbols of the power switches is the transistor symbol, but in the real circuitry, it can be a bipolar transistor, an IGBT, a power MOSFET or any other kind of switching power components. For the type of three-level inverter as shown in FIG. 4 (or any other similar derivative topology) where only one phase (phase A) out of three-phase is shown. The three gate signals of 122, 124, 126 are used to drive the gates of the three switches Qtop 200, Qbottom 402, and Qcl 204, respectively. For the other two phases B and C, the gate signal groups of (142, 144, 146) and (162, 164, 166) are used to drive the top, the clamp and the bottom switches, respectively. However for a diode-clamped three-level inverter as shown in FIG. 5, there is another stage of logic gates which need to be inserted as shown in FIG. 6. The signals 122, 142, 162 are connected with 124, 144, 164 into three OR-gates 201, 202, 203 to generate three top-clamp control signals 128, 148, 168. Similarly the signals 126, 146, 166 are connected with 124, 144, 164 into three OR-gates 301, 404, 303 to generate three bottom-clamp control signals 130, 150, 170. Connection of the gate signals 122, 128, 130, 126 into phase A of the diode-clamped three-level inverter are shown in FIG. 5. Similar connections can be made to derive gate signals 142, 148, 150, 146 for phase B and gate signals 162, 168, 170, 166 for phase C.

The above described methods theoretically introduce zero common mode noise into the system in the conversion process. It is known that in any practical application achievement of the theoretical minimum is unlikely due to imperfections in components as well as other factors. The above described method, however, achieves significantly closer to the theoretical minimum than any previously known conversion method, as well as achieving the theoretical minimum of zero common mode noise through computer simulation.

Although two embodiments of this invention have been disclosed, a worker of ordinary skill in this art would recognize that certain modifications would come within the scope of this invention. For that reason, the following claims should be studied to determine the true scope and content of this invention.

What is claimed is:

1. A method for controlling a three-level inverter/converter using a two-level inverter/converter controller comprising the steps of:
   receiving at least three three-phase pulse width modulation signals from a two-level inverter/converter controller;
   processing said three-phase pulse width modulation signals using a logic circuit, the processing further including the steps of creating a first output signal by subtracting a second input signal from a first input signal, creating a second output signal by subtracting a third input signal from said second input signal; and creating a third output signal by subtracting said first input signal from said third input signal; and
   outputting three-phase pulse width modulation signals compatible with a three-level inverter.

2. The method of claim 1 wherein said step of receiving at least three three-phase pulse width modulation signals from a two-level inverter controller comprises the additional steps of:
   determining three complimentary pairs of signals from a six signal output;
   selecting one signal from each of said complimentary pairs; and
   receiving each of said one signal from each of said complimentary pairs.

3. The method of claim 1 wherein said step of processing said three-phase pulse width modulation signals using a logic circuit comprises the additional step of:
   inverting said first output signal to create a first inverted output signal;
   inverting said second output signal to create a second inverted output signal; and
   inverting said third output signal to create a third inverted output signal.

4. The method of claim 3 wherein said step of processing said three-phase pulse width modulation signals using a logic circuit comprises the additional step of:
   creating a first combined output signal by performing a NOR operation on said first output signal and said first inverted output signal;
   creating a second combined output signal by performing a NOR operation on said second output signal and said second inverted output signal; and
   creating a third combined output signal by performing a NOR operation on said third output signal and said third inverted output signal.

5. The method of claim 1 wherein said step of outputting three-phase pulse width modulation signals compatible with a three-level inverter additionally comprises outputting at least said first, second, and third output signal.

6. The method of claim 1 wherein said step of outputting three-phase pulse width modulation signals compatible with a three-level inverter additionally comprises outputting at least a first, second, and third inverted output signal.

7. The method of claim 1 wherein said step of outputting three-phase pulse width modulation signals compatible with a three-level inverter additionally comprises outputting at least a first, second, and third combined output signal.

8. The method of claim 1 wherein the step of processing said three-phase pulse width modulation signals using a logic circuit introduces a theoretical minimum of zero common mode noise.

9. The method of claim 1 wherein said logic circuit comprises digital components and analog components.

10. The method of claim 1 wherein said logic circuit comprises digital components.

11. A power inverter control signal conversion circuit comprising:
   at least one digital to analog converter circuit;
   at least one analog to digital converter circuit;
   at least one analog summation circuit;
   at least one analog inverter circuit;
   each of said at least one digital to analog converter circuit, said at least one analog to digital converter circuit, said at least one analog summation circuit, and said at least one analog inverter circuit a being configured relative to each other such that the power inverter control signal conversion circuit is capable of performing the steps of:
   receiving at least three three-phase pulse width modulation signals from a two-level inverter controller;
   processing said three-phase pulse width modulation signals using a logic circuit; and
   outputting three-phase pulse width modulation signals compatible with a three-level inverter.

12. The device of claim 11 wherein said at least one digital to analog converter circuit comprises at least one digital to analog converter connected to each phase of said three-phase pulse width modulation signal.

13. The device of claim 11 wherein said at least one analog to digital converter circuit comprises at least one analog to digital converter connected to each phase of said three-phase pulse width modulation signal.

14. The device of claim 11 wherein said at least one analog summation circuit comprises at least one summer connected to each phase of said three-phase pulse width modulation signal.

15. The device of claim 11 wherein said at least one analog inverter circuit comprises and least one analog inverter connected to each phase of said three-phase pulse width modulation signal.

16. The device of claim 11 wherein said signal conversion circuit additionally comprises at least one digital NOT/OR circuit.

17. The device of claim 16 wherein said at least one digital NOR circuit comprises at least one digital NOR gate connected to each phase of said three-phase pulse width modulation signal.

18. The device of claim 11 wherein said signal conversion circuit additionally comprises at least one digital inverter circuit, at least one digital AND gate circuit, and at least one digital NOR circuit.

19. The device of claim 18 wherein said digital inverter circuit comprises at least one digital inverter connected to each phase of said three-phase modulation signal.

20. The device of claim 18 wherein said at least one digital AND gate circuit comprises at least two digital AND gates connected to each phase of said three-phase modulation signal.

21. The device of claim 18 wherein said at least one digital NOR circuit comprises at least one digital NOR gate connected to each phase of said three-phase modulation signal.

* * * * *